April 17, 1951          A. AFRICANO          2,548,926
INSULATED TRAP FOR ROCKET PROJECTILES
Filed Oct. 3, 1944
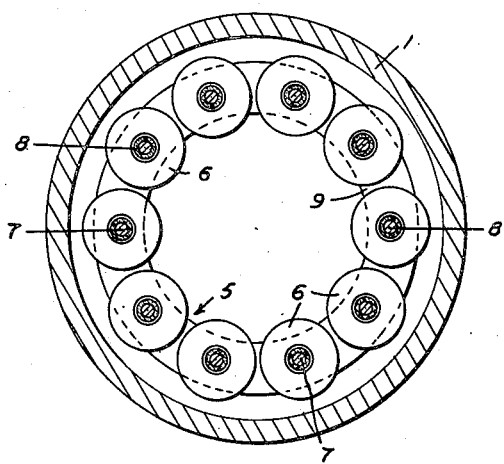
Fig-2-
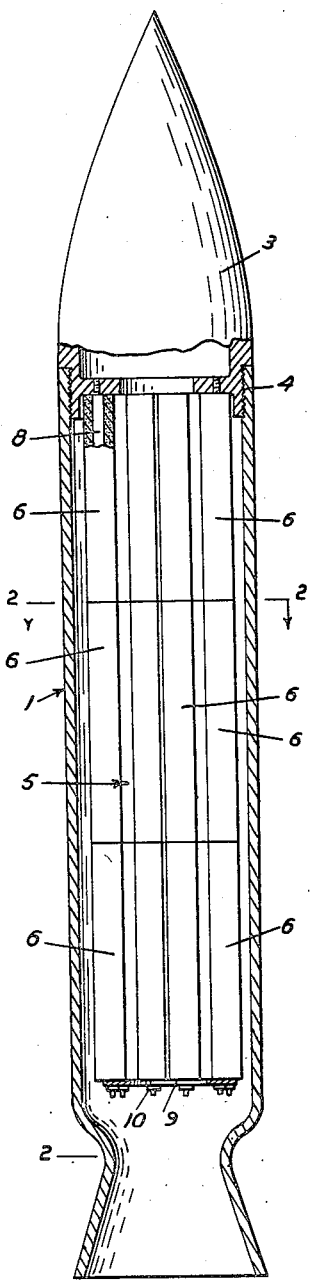
Fig-1-
Fig-3-
Inventor
Alfred Africano
By C. E. Kerrstrom & H. E. Thibodeau
Attorneys Patented Apr. 17, 1951

2,548,926

UNITED STATES PATENT OFFICE 2,548,926

INSULATED TRAP FOR ROCKET PROJECTILES

Alfred Africano, Cumberland, Md., assignor to the United States of America as represented by the Secretary of War Application October 3, 1944, Serial No. 556,954

1 Claim. (Cl. 60—35.6)

This invention relates to improvements in rocket projectiles, more particularly to an improved construction reducing slivering of the propellant charge.

The propellent charge of a rocket projectile is usually supported on some form of trap wires. A propellent arrangement frequently utilized comprises tubular grains of powder strung on steel rods or so-called trap wires which support such powder grains until the burning of the grain is substantially completed. One of the major difficulties met with in jet propelled devices is the formation of slivers of unburned powder toward the end of the burning of the propellent charge. Theoretically the powder grains burn at a uniform rate inwardly from all surfaces so that the powder should be consumed evenly. Nevertheless slivers of unburned powder which may comprise ½ or even ¼ sections of thin cylinders of powder frequently break loose from the grains. These slivers then either blow out of the rocket motor thru the nozzle, or they ignite within the rocket motor, or they may clog the nozzle momentarily. In any event, such sliver formation is highly undesirable and reduces the efficiency of the rocket motor.

Accordingly, it is an object of this invention to substantially overcome the formation of slivers of unburned powder in a rocket projectile.

A particular object of this invention is to provide a heat insulating covering for the trap wires for the propellent charge of a rocket projectile to reduce slivering of the charge.

The specific nature of the invention as well as other objects and advantages thereof will clearly appear from a description of a preferred embodiment as shown in the accompanying drawing in which:

Fig. 1 is a longitudinal sectional view of a rocket motor embodying this invention.

Fig. 2 is a sectional view of Fig. 1 taken on the plane 2—2.

Fig. 3 is a longitudinal sectional view of a trap wire constructed in accordance with this invention.

There is shown in Fig. 1 in assembled relation a rocket projectile embodying this invention. The rocket projectile comprises a tubular motor housing 1, one end of which terminates in a nozzle 2 of conventional Venturi construction. A head 3 is secured to the forward end of motor housing 1 as by threads 4 and contains a high explosive charge or other "pay load." A propellent charge 5 comprising a plurality of tubular powder grains 6 is longitudinally mounted within the motor housing 1. The individual powder grains 6 are suspended on metallic trap wires 7 which are equiradially located and disposed parallel to the axis of rocket motor 1. Trap wires 7 are preferably screwed into suitably threaded holes in the base of head 3. The powder grains 6 are retained on each trap wire 7 by any desired means, such as by a washer 9 and nut 10 threaded on the free end of trap wire 7.

Trap wires 7 are coated with a heat insulating material 8 such as asbestos. Such a heat insulating coating prevents the trap wires from over heating and substantially reduces the formation of unburned powder slivers.

If however slivers of powder are formed, as for example, by reason of the fact that the cylindrical perforation does not uniformly coincide with the central longitudinal axis of the powder grain whereby the web thickness of the grain may not be uniform throughout its entire length, which results in one portion of the grain being completely consumed before the rest thereof, these slivers are not ignited as would be the case with uninsulated trap wires, but may be blown out of the chamber through the nozzle. At any rate it has been discovered that the tendency of sliver formation is substantially overcome by providing the trap wires with a heat insulating coating. Thus the powder retained on the trap wires will burn evenly and to completion. The heat insulating material 8, of which asbestos is merely a specific example, is preferably constructed in the form of a tube and slipped over the trap wire prior to assembling the tubular grains of powder 6. Thus the asbestos coating 8 separates powder grains from the trap wire.

Another type of insulating material which may be utilized comprises a resinous or plastic material. Such material has a substantitally slower burning rate than the propellent powder. Suitable resinous and plastic materials are the various vinyl polymers made from vinyl chloride, vinyl acetate, vinyl alcohol, or vinylidene resins. Other satisfactory materials may be made from polymerized unsaturated oils such as tung oil polymers.

The materials listed above may be applied in the form of a coating directly to the trap wires or the material may be formed in tubes much as the asbestos tubing 8 utilized. Although these materials will burn, their burning rate is so much slower than that of the propellent powder grains that the propellent charge will be completely consumed before the coating materials can ignite. Thus such coating serves to keep the trap wires relatively cool until complete combustion of the propellent charge 5 has taken place.

From the foregoing description it is readily apparent that transfer of heat to the trap wires resulting from the combustion of the propellent charge is materially reduced by the insulating coating applied to the trap wires. As the trap wires 7 are kept comparatively cool, slivering of the powder grains 6 is substantially reduced, and further in the event any such slivers should form these slivers will not be ignited by the wires because of the reduced temperature of the trap wires.

By the term "trap member" as employed in this description and claim, I mean a supporting means for a solid element of propellent material such as a powder "grain," for supporting said element within a rocket combustion chamber in predetermined spaced relation to the walls of the chamber and in some cases to other powder grains so as to insure proper combustion of the propellent charge.

I claim:

In a rocket motor, a casing forming a combustion chamber and having a rearwardly-directed nozzle, a metallic trap wire extending longitudinally within said chamber in fixed relation with said casing, a tubular grain of propellent material strung on said trap wire, and a continuous imperforate tubular layer of heat insulating material interposed between said trap wire and propellent grain whereby the formation of slivers of propellent during burning is inhibited.

ALFRED AFRICANO.

REFERENCES CITED

The following references are of record in the file of this patent:

UNITED STATES PATENTS

| Number | Name | Date |
|---|---|---|
| 266,437 | Cunningham | Oct. 24, 1882 |
| 2,043,268 | Skinner | June 9, 1936 |
| 2,400,242 | Malina et al. | May 14, 1946 |
| 2,408,252 | De Ganahl | Sept. 24, 1946 |
| 2,446,560 | Skinner | Aug. 10, 1948 |

FOREIGN PATENTS

| Number | Country | Date |
|---|---|---|
| 502,560 | France | Feb. 24, 1920 |
| 516,865 | Great Britain | Jan. 12, 1940 |